(12) United States Patent
Ralston et al.

(10) Patent No.: US 8,424,629 B2
(45) Date of Patent: Apr. 23, 2013

(54) VEHICLE ENERGY ABSORBER FOR PEDESTRIAN'S UPPER LEG

(75) Inventors: Daniel D. Ralston, Walker, MI (US); David R. Seiter, Brighton, MI (US); Vidya Revankar, Rochester Hills, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 13/414,114

(22) Filed: Mar. 7, 2012

(65) Prior Publication Data
US 2012/0228048 A1 Sep. 13, 2012

Related U.S. Application Data

(60) Provisional application No. 61/450,852, filed on Mar. 9, 2011.

(51) Int. Cl.
*B60K 28/10* (2006.01)

(52) U.S. Cl.
USPC ..................... 180/274; 296/187.04

(58) Field of Classification Search ............... 180/274; 296/193.11, 187.04
See application file for complete search history.

(56) References Cited

U.S. PATENT DOCUMENTS

| | | | |
|---|---|---|---|
| 3,933,387 A | 1/1976 | Salloum et al. |
| 3,938,841 A | 2/1976 | Glance et al. |
| 4,275,912 A | 6/1981 | Bayer |
| 4,925,224 A | 5/1990 | Smiszek |
| 4,941,701 A | 7/1990 | Loren |
| 5,139,297 A | 8/1992 | Carpenter et al. |
| 5,290,078 A | 3/1994 | Bayer et al. |
| 5,290,079 A | 3/1994 | Syamai |
| 5,425,561 A | 6/1995 | Morgan |
| 5,706,908 A | 1/1998 | Sakai et al. |
| 5,988,305 A | 11/1999 | Sakai et al. |
| 5,988,713 A | 11/1999 | Okamura et al. |
| 6,048,022 A | 4/2000 | Ishibashi et al. |
| 6,068,320 A | 5/2000 | Miyano |
| 6,082,792 A | 7/2000 | Evans et al. |
| 6,247,745 B1 | 6/2001 | Carroll, III et al. |
| 6,315,339 B1 | 11/2001 | Devilliers et al. |
| 6,398,275 B1 | 6/2002 | Hartel et al. |
| 6,406,081 B1 | 6/2002 | Mahfet et al. |
| 6,443,513 B1 | 9/2002 | Glance |
| 6,467,821 B2 | 10/2002 | Hirota |
| 6,575,510 B2 | 6/2003 | Weissenborn |

(Continued)

FOREIGN PATENT DOCUMENTS

| | | |
|---|---|---|
| JP | 2006-027288 | 2/2006 |
| JP | 2008-168844 | 7/2008 |

(Continued)

*Primary Examiner* — Eric Culbreth
(74) *Attorney, Agent, or Firm* — Price Heneveld LLP

(57) ABSTRACT

An apparatus is provided for improved pedestrian safety during impact by a vehicle, where the vehicle includes a bumper, a hood, and structural components located generally above the bumper and in front of the hood. The apparatus includes an energy absorber with at least one crush lobe attached to a horizontal top beam of the bulkhead in a low-visible position when the hood is closed, but with the energy absorber positioned to crush and absorb energy to reduce injury to a pedestrian's upper leg when a pedestrian is impacted by the vehicle. The energy absorber is made of polymeric material, and the crush lobe is hollow and shaped to crush upon impact for maximum energy absorption.

18 Claims, 5 Drawing Sheets

U.S. PATENT DOCUMENTS

| | | |
|---|---|---|
| 6,609,740 B2 | 8/2003 | Evans |
| 6,644,691 B2 * | 11/2003 | Husain .................. 280/784 |
| 6,644,701 B2 | 11/2003 | Weissenborn et al. |
| 6,663,150 B1 | 12/2003 | Evans |
| 6,669,251 B2 | 12/2003 | Trappe |
| 6,669,252 B2 | 12/2003 | Roussel et al. |
| 6,672,635 B2 | 1/2004 | Weissenborn et al. |
| 6,685,243 B1 | 2/2004 | Evans |
| 6,715,592 B2 | 4/2004 | Suzuki et al. |
| 6,726,262 B2 | 4/2004 | Marijnissen et al. |
| 6,746,061 B1 | 6/2004 | Evans |
| 6,758,506 B2 | 7/2004 | Malteste et al. |
| 6,848,730 B2 | 2/2005 | Evans |
| 6,848,738 B2 | 2/2005 | Kempf et al. |
| 6,866,313 B2 | 3/2005 | Mooijman et al. |
| 6,874,832 B2 | 4/2005 | Evans et al. |
| 6,877,785 B2 | 4/2005 | Evans et al. |
| 6,883,627 B1 | 4/2005 | Staines et al. |
| 6,890,009 B2 | 5/2005 | Murata et al. |
| 6,908,127 B2 | 6/2005 | Evans |
| 6,920,954 B2 | 7/2005 | Hashimoto et al. |
| 6,923,494 B2 | 8/2005 | Shuler et al. |
| 6,938,936 B2 | 9/2005 | Mooijman et al. |
| 6,949,209 B2 | 9/2005 | Zander et al. |
| 6,962,379 B2 | 11/2005 | Minami et al. |
| 6,994,384 B2 | 2/2006 | Shuler et al. |
| 6,997,490 B2 | 2/2006 | Evans et al. |
| 7,044,515 B2 | 5/2006 | Mooijman et al. |
| 7,052,056 B2 | 5/2006 | Weissenborn et al. |
| 7,073,831 B2 | 7/2006 | Evans |
| 7,086,690 B2 | 8/2006 | Shuler et al. |
| 7,090,289 B2 | 8/2006 | Koura |
| 7,114,765 B2 | 10/2006 | Ishikawa et al. |
| 7,131,674 B2 | 11/2006 | Evans et al. |
| 7,134,700 B2 | 11/2006 | Evans |
| 7,144,054 B2 | 12/2006 | Evans |
| 7,144,055 B2 | 12/2006 | Kimura et al. |
| 7,150,495 B2 | 12/2006 | Fayt et al. |
| 7,159,911 B2 | 1/2007 | Nguyen et al. |
| 7,163,242 B2 | 1/2007 | Shuler et al. |
| 7,163,243 B2 | 1/2007 | Evans |
| 7,172,227 B2 | 2/2007 | Weissenborn et al. |
| 7,188,876 B2 | 3/2007 | Jaarda et al. |
| 7,204,545 B2 | 4/2007 | Roux et al. |
| 7,220,374 B2 | 5/2007 | Zander et al. |
| 7,222,896 B2 | 5/2007 | Evans |
| 7,222,897 B2 | 5/2007 | Evans et al. |
| 7,234,741 B1 | 6/2007 | Reynolds et al. |
| 7,278,667 B2 | 10/2007 | Mohapatra et al. |
| 7,296,833 B2 | 11/2007 | Mohapatra et al. |
| 7,325,642 B2 | 2/2008 | Roux et al. |
| 7,360,822 B2 | 4/2008 | Carroll, III et al. |
| 7,399,014 B2 | 7/2008 | Mellis et al. |
| 7,404,593 B2 | 7/2008 | Cormier et al. |
| 7,413,239 B2 | 8/2008 | Mitsuyama |
| 7,467,680 B2 | 12/2008 | Mason |
| 7,494,165 B2 | 2/2009 | Evans et al. |
| 7,578,548 B2 | 8/2009 | Behr et al. |
| 7,635,157 B2 | 12/2009 | Wang et al. |
| 7,690,720 B2 | 4/2010 | Wang et al. |
| 7,810,877 B2 | 10/2010 | Ishitobi |
| 7,849,559 B2 | 12/2010 | Lindmark et al. |
| 7,984,943 B2 | 7/2011 | Iwano et al. |
| 7,988,222 B2 | 8/2011 | Fujimoto |
| 8,016,347 B2 | 9/2011 | Uchino |
| 8,052,198 B2 | 11/2011 | Seksaria et al. |
| 2002/0060462 A1 | 5/2002 | Glance |
| 2002/0070584 A1 | 6/2002 | Carroll, III et al. |
| 2003/0214151 A1 | 11/2003 | Vismara et al. |
| 2003/0227183 A1 | 12/2003 | Weissenborn et al. |
| 2004/0036302 A1 | 2/2004 | Shuler et al. |
| 2004/0066048 A1 | 4/2004 | Mooijman et al. |
| 2004/0174025 A1 | 9/2004 | Converse et al. |
| 2004/0201255 A1 | 10/2004 | Jonsson |
| 2004/0256867 A1 | 12/2004 | Evans et al. |
| 2004/0262952 A1 | 12/2004 | Kempf et al. |
| 2005/0057076 A1 | 3/2005 | Roux et al. |
| 2005/0082875 A1 | 4/2005 | Ikeda et al. |
| 2005/0088016 A1 | 4/2005 | Ito et al. |
| 2005/0269837 A1 | 12/2005 | Carroll et al. |
| 2005/0280287 A1 | 12/2005 | Koura |
| 2006/0001277 A1 | 1/2006 | Mellis et al. |
| 2006/0006698 A1 | 1/2006 | Ishikawa et al. |
| 2006/0018089 A1 | 1/2006 | Chou |
| 2006/0220418 A1 | 10/2006 | Behr et al. |
| 2006/0226679 A1 | 10/2006 | Mairing |
| 2006/0261611 A1 | 11/2006 | Mohapatra et al. |
| 2007/0069535 A1 | 3/2007 | Mohapatra et al. |
| 2007/0210615 A1 | 9/2007 | Tamada |
| 2008/0042454 A1 | 2/2008 | Garnweidner |
| 2008/0088154 A1 | 4/2008 | Rocheblave et al. |
| 2008/0185871 A1 | 8/2008 | Ishiyama et al. |
| 2009/0025995 A1 | 1/2009 | Wang et al. |
| 2009/0026807 A1 | 1/2009 | Wang et al. |
| 2009/0065277 A1 | 3/2009 | Wang et al. |
| 2009/0195020 A1 | 8/2009 | Wang et al. |
| 2009/0206618 A1 | 8/2009 | Ralston et al. |
| 2009/0226807 A1 | 9/2009 | Nakamura |
| 2009/0295193 A1 | 12/2009 | Park |
| 2010/0045070 A1 | 2/2010 | Rocheblave et al. |
| 2010/0140979 A1 | 6/2010 | Seksaria et al. |
| 2011/0214932 A1 | 9/2011 | Ralston et al. |

FOREIGN PATENT DOCUMENTS

| | | |
|---|---|---|
| JP | 2009-234380 | 10/2009 |
| JP | 2010-030501 | 2/2010 |
| JP | 2011-012807 | 1/2011 |

* cited by examiner

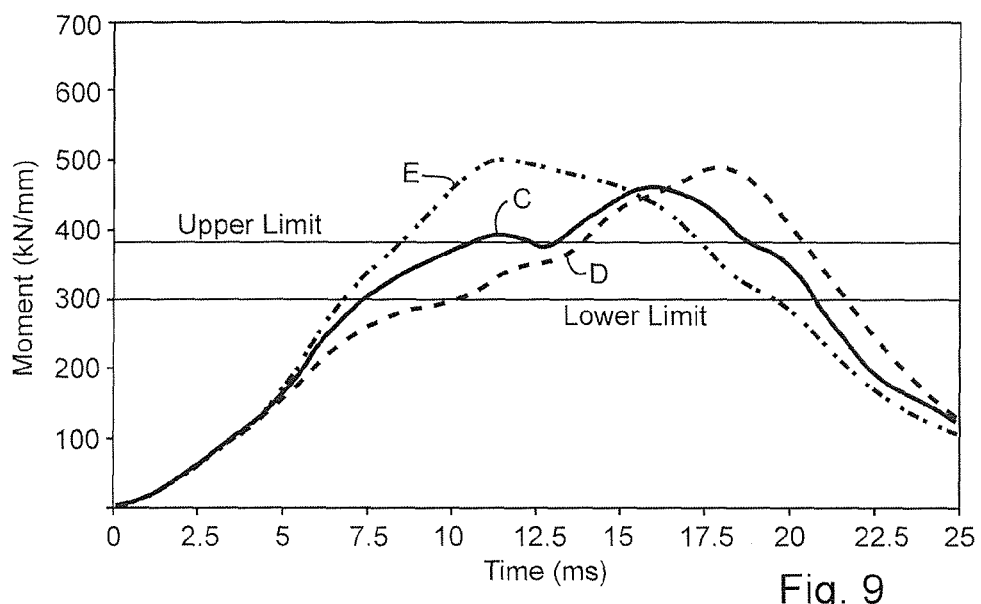
Fig. 9
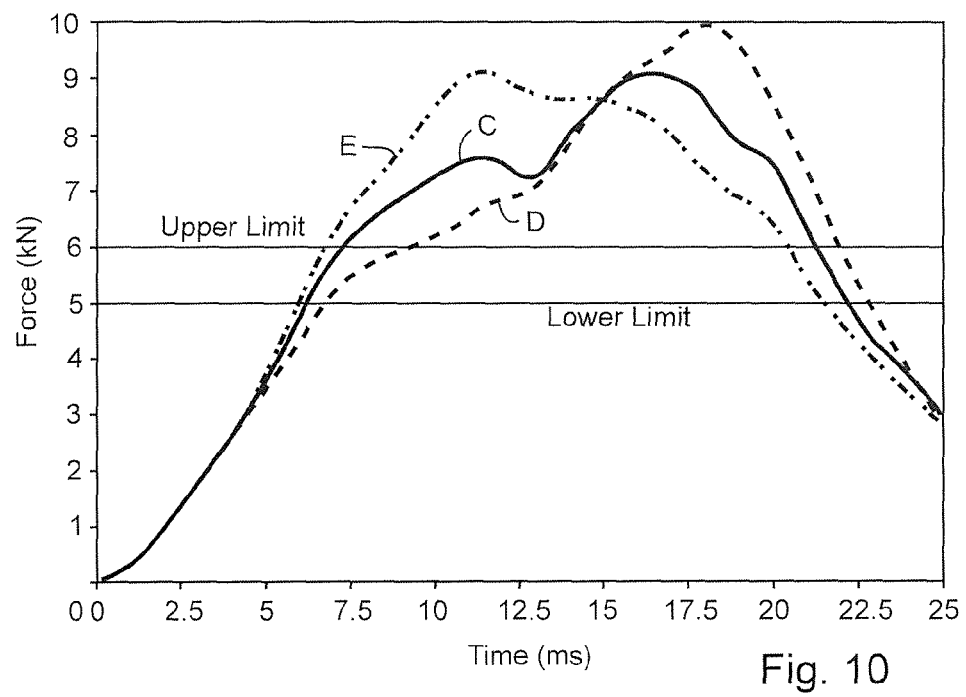
Fig. 10
| | Sum Force (kN) | Bending Moment (kN/mm) |
|---|---|---|
| Interation C | 9.04 | 460.75 |
| Interation D | 9.90 | 489.69 |
| Interation E | 9.08 | 502.43 |
Fig. 11

VEHICLE ENERGY ABSORBER FOR PEDESTRIAN'S UPPER LEG

This application claims benefit under 35 USC §119(e) of provisional application Ser. No. 61/450,852, filed Mar. 9, 2011, entitled VEHICLE ENERGY ABSORBER FOR PEDESTRIAN'S UPPER LEG, the entire contents of which are incorporated herein by reference.

BACKGROUND

The present invention relates to vehicle front ends adapted for reducing injury to a pedestrian upon impact, and more particularly relates to a vehicle energy absorber apparatus in the upper front area of a vehicle front end, where the energy absorber apparatus includes an energy absorber with crush lobes that absorb energy upon impact thus reducing injury to a pedestrian's upper leg or child's head.

Traditionally, vehicles are constructed to provide safety to vehicle occupants during a crash. Improvements are desired to maintain that objective, but also provide improved safety to a pedestrian. In particular, a pedestrian is typically struck by a front of a moving vehicle, with the vehicle bumper, front of hood, and other front end components transmitting a relatively high force and energy into the pedestrian. This can result in significant body injury, including injury to the pedestrian's legs during initial impact, followed by upper body and head injury as the pedestrian or child tumbles toward the vehicle and onto the vehicle's hood.

SUMMARY OF THE PRESENT INVENTION

In one aspect of the present invention, an apparatus for improved pedestrian safety includes a vehicle front end including a hood, a bulkhead and structural components located generally above the bumper and near a front of the hood; and an energy absorber having at least one hollow crush lobe and an attachment flange. The energy absorber is positioned near at least one of the bulkhead and the structural components with the at least one crush lobe extending away from the bulk head in a position where, upon a pedestrian impact directed toward an upper portion of the bulkhead, sidewalls of the at least one crush lobe crumple and collapse to absorb energy.

In another aspect of the present invention, an improvement is made to a vehicle including a hood, a bulkhead and front end components located generally in an upper portion of the bulkhead near a front of the hood, the bulkhead including a top horizontal beam. The improvement includes an energy absorber having at least one hollow crush lobe and an attachment flange attached to one of the bulkhead and front end components with the at least one crush lobe extending away from the bulk head in a position where, upon a pedestrian impact directed toward the bulkhead, sidewalls of the at least one crush lobe crumple and collapse toward the beam to absorb energy.

In another aspect of the present invention, a method is provided for improving pedestrian safety when impacted by a vehicle, where the vehicle includes a hood, a bulkhead and structural components near a front of the hood. The method comprises steps of providing a top horizontal beam of the bulkhead; providing an energy absorber having at least one hollow crush lobe and an attachment flange; and positioning the energy absorber in front of and near to the bulkhead with the at least one crush lobe extending away from the bulk head in a position where, upon a pedestrian impact directed toward the bulkhead, sidewalls of the at least one crush lobe crumple and collapse toward the beam to absorb energy.

These and other aspects, objects, and features of the present invention will be understood and appreciated by those skilled in the art upon studying the following specification, claims, and appended drawings.

BRIEF DESCRIPTION OF DRAWINGS

FIG. 9 is a graph showing bending moment versus time for three impacts, each including a similar energy absorber but with different wall thicknesses, iterations C, D and E having wall thicknesses of 2 mm, 1 mm and 3 mm wall thickness.

FIG. 10 is a graph showing force output versus time for the same three impacts shown in FIG. 9, each impact including a similar energy absorber but with different wall thicknesses.

FIG. 11 is a chart showing different force and bending moments for different front end arrangements, the iterations C-E including different energy absorbers as noted above in FIGS. 9-10.

DESCRIPTION OF PRIOR ART

Figure 1:
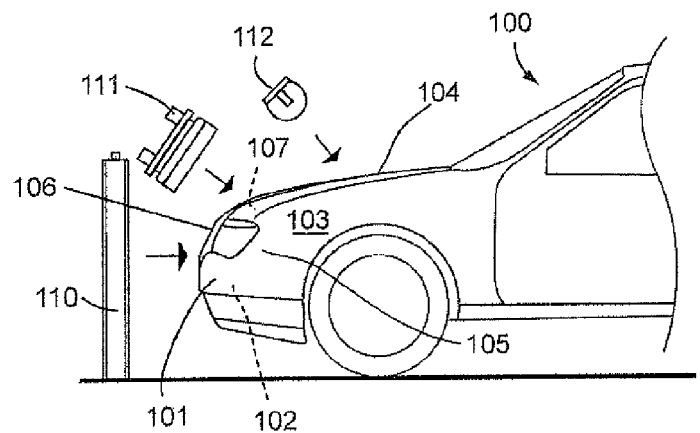
FIG. 1 is a side elevational view of a vehicle front end and three standardized impactors that simulate an adult pedestrian's leg (post-like device impacting from horizontal direction), upper-leg (block-like device impacting from angle at front of hood), and head (ball-like device impacting from angle at center of hood), respectively, the testers being useful for testing for pedestrian safety.
Figure 2:
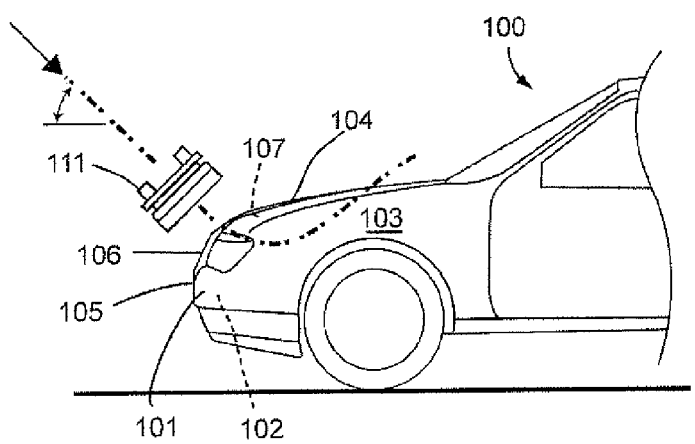
FIG. 2 is a side elevational view of the vehicle front end and the angle-impacting upper-leg impactor, showing an angle of impact and a general direction and follow through of impact, the impactor having an adjustable mass and a relatively flat leading edge.

A vehicle 100 (FIGS. 1-2) includes, among other things, a bumper system 101 with reinforcement beam 102, fenders 103, hood 104, front fascia 105, grille 106, and upper front end structural components 107 generally hidden from view but constructed to support the aforementioned items. Pedestrian-simulating impactors include a leg-simulating impactor 110 for impacting the bumper system, an upper-leg-simulating impactor 111 for impacting an upper front area of a vehicle at a first angle to horizontal, and a head-simulating impactor 112 for impacting a hood area at a more-vertical steeper angle.

DETAILED DESCRIPTION OF PREFERRED EMBODIMENTS

An apparatus 20 (FIG. 1) for improved pedestrian safety during impact includes a vehicle having a bumper system 21 with reinforcement beam 21A, a hood 22, and structural components 23 located generally above the bumper 21 and in front of the hood 22. An energy absorber 24 having at least one hollow energy-absorbing crush lobe 25 is attached to one of the structural components 23, such as a latch-supporting/ grille-supporting top horizontal beam 26. The energy absorber 24 is in a low visible position when the hood 22 is closed, but with the energy absorber's crush lobe 25 positioned to crush and absorb energy to reduce injury to a pedestrian's upper leg (or child's head) when impacted by the vehicle.

Figure 3:
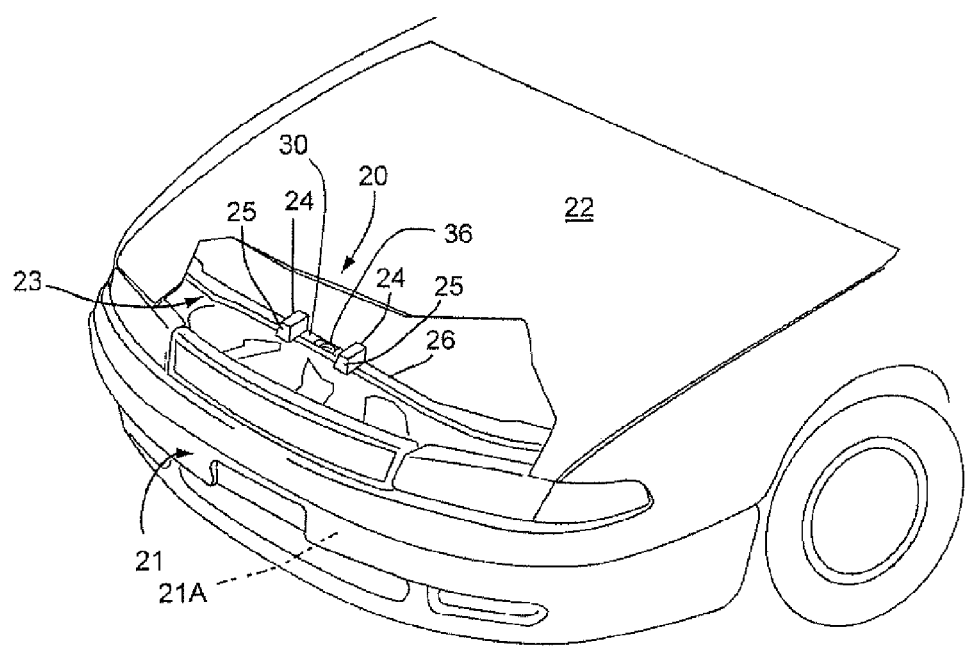
FIGS. 3-5 are perspective views of first, second, and third energy absorbers, respectively, each being attached to a structural component.

FIG. 3 shows two energy absorbers 24, one adjacent each side of the hood latch 36. Each energy absorber 24 has one crush lobe 25 and is attached to a top of the top horizontal beam 26 (also called "structural member" herein), with a part of its body extending forwardly therefrom. The crush lobe 25 is generally a hollow box-shape (or cone-shape or wedge-shape) so that its sidewalk crumble and crush during an impact to absorb a maximum amount of energy. A top wall of the illustrated energy absorber fits relatively close to the upper/outer front sheet metal (or hood), such that the top wall is angled and slightly curved. By placing the top wall close to the adjacent outer surface, the energy absorber 24 begins to crush relatively soon after the initial impact, thus providing a maximum crush stoke for distributed energy absorption. The illustrated energy absorbers 24 each include apertured flanges, and are attached to the top horizontal beam 26 by a fastener, such as a screw, push-pin, rivet, snap fastener, or hook-attachment system. The illustrated energy absorbers 24 are injection molded of a non-foam polymeric material (e.g. polypropylene, polyolefin, or TPO material) that absorbs energy when crushed, such as are commercially available. However, it is contemplated that different materials can be used and that different attachment structures can be used. It is also contemplated that the energy absorbers 24 could be over-molded onto the top horizontal beam 26 or integrally formed therewith. The illustrated energy absorber has its base flange 30 abut a top surface of the top horizontal beam 26 of the structural components 23, and its aperture attachment flange is attached to the top of the horizontal beam by push-pin fasteners or screws. However, it is contemplated that it could be attached to other structural components of the vehicle front end. The illustrated crush lobes each include a plurality of interconnected sidewalls that extend from the base flange 30, and a top wall interconnecting the sidewalk and closing the hollow crush lobe. Apertured flanges are formed by the base flange 30 between adjacent crush lobes 25 to create a unitary product that can be injection molded by a single material in a one-shot process.

Several variations are contemplated. For example, the illustrated energy absorber 24 is made of polymeric material, but it is contemplated that other materials could be used. The illustrated energy absorber 24 is a separate component mechanically attached to a structural component forming an upper front of a vehicle; however it could be adhered or overmolded onto the structural component. Also, the energy absorber (24) could be attached to and carried by fascia covering a front of the vehicle such that it is positioned in front of the top horizontal beam 26, instead of being directly attached to the top horizontal beam 26. The illustrated energy absorber 24 extends onto and abuts an adjacent two orthogonal surfaces of the one structural component (i.e. it abuts a top and front surface of the top beam of the structural component). Notably, the energy absorber could be integrally molded as part of a structural component, such as by a two shot molding or overmolding process. Advantageously, the present energy absorber 24 includes a crush lobe 25 that extends/wraps onto and abuts two adjacent surfaces of the structural component, such that the energy absorber is better able to undergo a crushing collapse resulting in "good" energy absorption when impacted along an angled direction of impact, such as by an impacted pedestrian (see FIG. 1, impactor 111).

Figure 4:
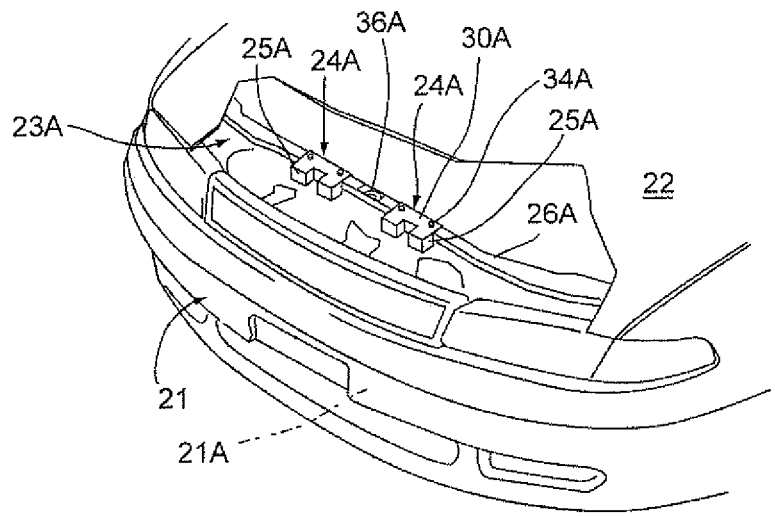

FIG. 4 is a view similar to FIG. 3, but in FIG. 4 the energy absorber 24A has two crush lobes 25A that extend generally forwardly and that are positioned generally in front of the top beam 26A of the structural components 23A. The energy absorber 24A may or may not have a crush lobe positioned on top of the top wall of the top horizontal beam 26A. This depends on functional requirements of the vehicle. For example, in some trucks and other vehicles having a relatively high front end and relatively squared-off, front end the positions of crush lobes may be considerably different than in other vehicles that have a lower front end and more aerodynamic shape (see FIGS. 1-2). Specifically, the illustrated energy absorber 24A includes a base flange 30A abutting a top surface of the top horizontal beam 26A of the structural components 23A. The base flange 30A forms an apertured flange receiving fasteners 34A that secure the energy absorber 24A to the top horizontal beam 26A.

Figure 5:
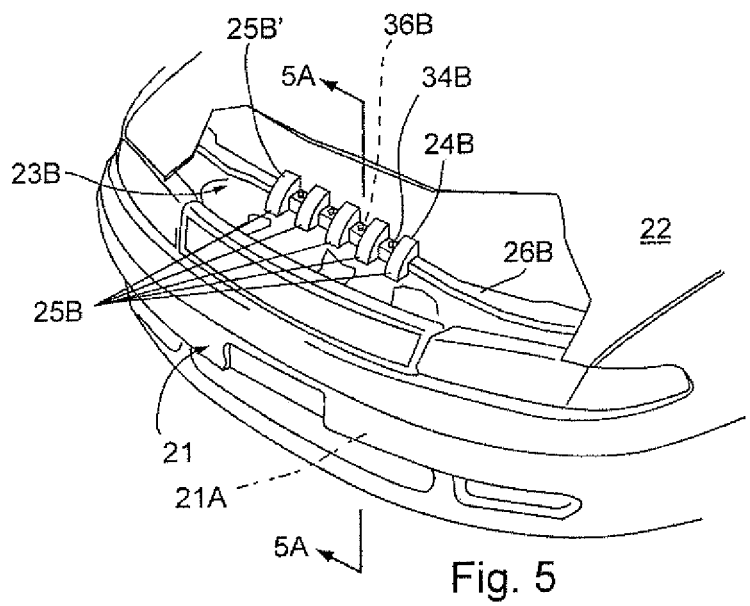
Figure 5A:
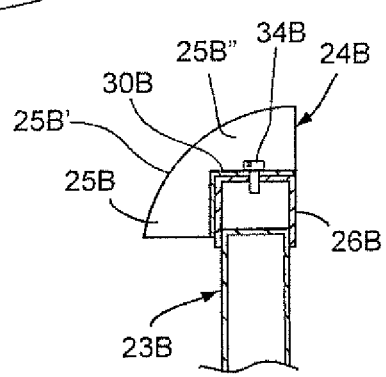
FIG. 5A is a vertical cross section transversely through FIG. 5.

FIG. 5 is a view similar to FIGS. 3-4, but in FIG. 5 the energy absorber 24B is a single molding with five crush lobes 25B, the center crush lobe 25B being located generally inline with a center of the vehicle and with the vehicle's hood latch 36B (not specifically shown, hidden by the center crush lobe 25B). Each crush lobe 25B has a rear portion positioned on the top of the top horizontal beam 26B of the front end structural components 23B, and has a forwardly-extending portion that extends forward of the structural member 26B. As shown in FIG. 5A, a top wall 25B' of each crush lobe 25B is curved forwardly and downwardly to match an aerodynamic shape of a front of the vehicle, the top wall 25B' connecting side walls 25B" of the crush lobe 25B. About a front third of the crush lobe 25B forms a wedge shape with a relatively pointed front edge. It is noted that the crush lobes 25B are relatively uniformly spaced and extend vertically and are forwardly elongated, such that they provide particularly good impact absorbing characteristics for a child's head. Specifically, the illustrated energy absorber 24B includes a base flange 30B abutting a top surface of the top horizontal beam 26B of the structural components 23B. The base flange 30B forms an apertured flange receiving fasteners 34B that secure the energy absorber 24B to the beam 26B.

Figure 6:
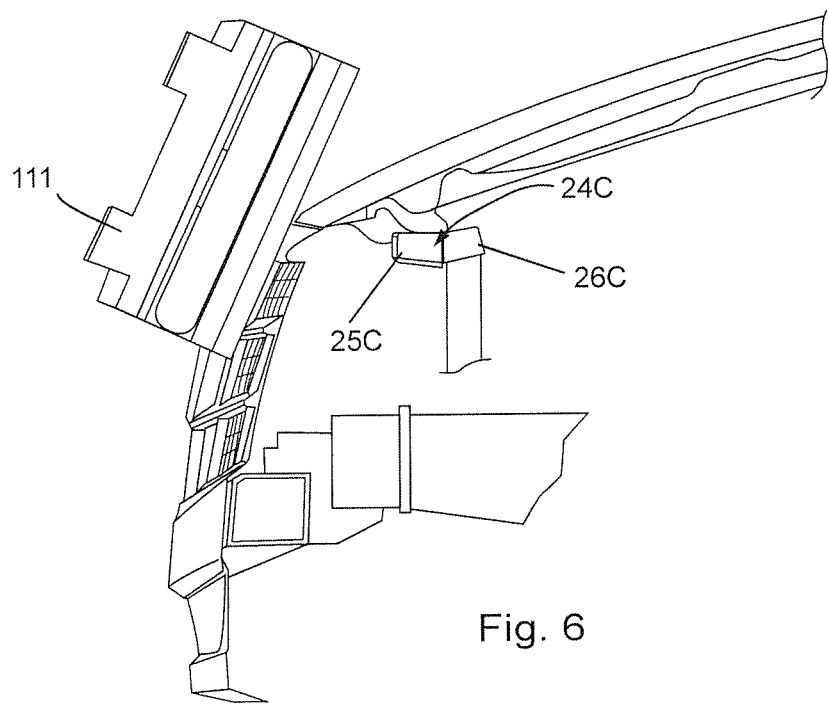
FIG. 6 is a fragmentary perspective view showing a vehicle front end, including the energy absorber and structural components and the mid-level impactor prior to impact.
Figure 7:
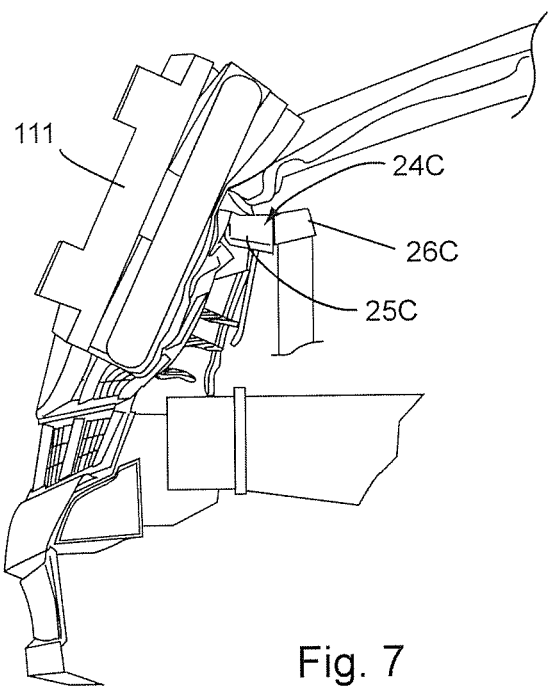
FIG. 7 is a fragmentary perspective view similar to FIG. 6 but after sufficient impact by the upper-leg impactor to contact a crush lobe of the energy absorber.

FIG. 6 is a fragmentary perspective view showing a computer generated image of a vehicle front end, including the energy absorber 24C and structural components 26C and the upper-leg impactor 111 prior to impact, and FIG. 7 is after impact but prior to completed impact. The stroke of impact depends of course on numerous variables related to vehicle speed, the pedestrian's positions and reaction to impending impact, and the vehicle and pedestrian general characteristics.

Figure 8:
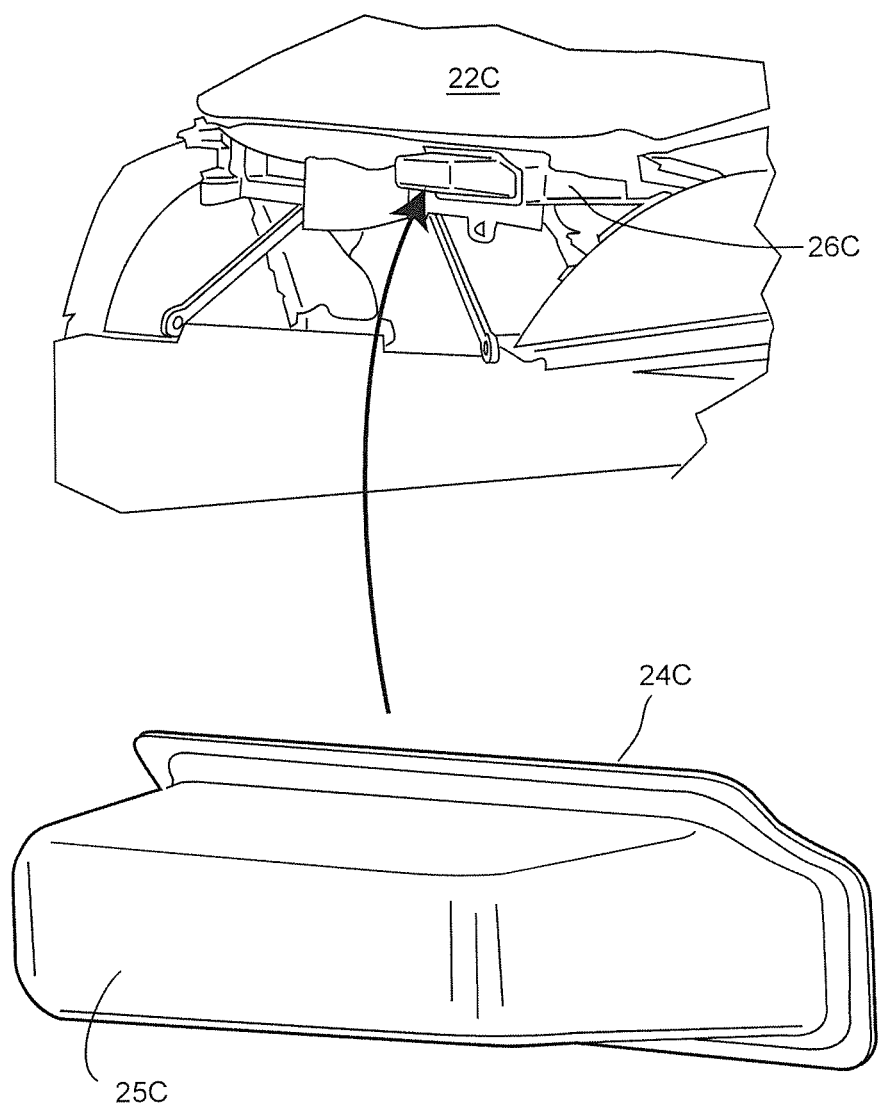
FIG. 8 is a fragmentary perspective view similar to FIG. 6, but with several components removed to better show the energy absorber, the energy absorber having a single crush lobe positioned adjacent a hood latch of the vehicle.

FIG. 8 illustrates an energy absorber 24C positioned on a front surface of a top beam of a structural member 26C. The crush lobe 25C of the energy absorber 24C is configured to collapse and absorb energy during a pedestrian impact.

FIG. 9 is a graph showing bending moment versus time for three impacts by a mid-level impactor that impacts at an angled direction, each including an energy absorber (24) of similar material, shape and size, but with different wall thicknesses. Specifically, iteration C includes a 2 mm wall thickness, iteration D includes a 1 mm wall thickness, and iteration E includes a 3 mm wall thickness. As shown in the FIG. 9, the iteration D (1 mm wall thickness) has a lesser energy absorption of about 300 kN/mm at 10 ms (millisecond) intrusion, while the iteration C (2 mm wall thickness) has a mid-amount energy absorption of about 370 kN/mm at 10 ms, and the iteration E (3 mm thickness) has a greater energy absorption of about 460 kN/mm at 10 ms. However, this reverses at 18.75 ms, with iteration D being about 475 kN/mm, iteration C being about 380 kN/mm and iteration E being about 350 kN/mm.

FIG. 10 is a graph showing force output moment versus time for three impacts by a mid-level impactor that impacts at an angled direction, each including an energy absorber (24) of similar material, shape and size, but with different wall thicknesses. Specifically, like in FIG. 9, iteration C includes a 2 mm wall thickness, iteration D includes a 1 mm wall thickness, and iteration E includes a 3 mm wall thickness. As shown in the FIG. 10, the iteration D (1 mm wall thickness) has a lesser force of about 625 kN at 10 ms (millisecond) intrusion, while the iteration C (2 mm wall thickness) has a mid-amount force of about 725 kN at 10 ms, and the iteration E (3 mm thickness) has a greater force of about 850 kN at 10 ms. However, this reverses at 18.75 ms, with iteration D being about 975 kN, iteration C being about 800 kN and iteration E being about 700 kN.

FIG. 11 is a chart illustrating a sum force and sum bending moment (kN/mm) for each of iterations C, D and E. As shown, the sum force for iterations C (2 mm wall thickness), D (1 mm wall thickness), and E (3 mm wall thickness) are 9.04 kN, 9.90 kN, and 9.08 kN, respectively. Similarly, the sum bending moment for iterations C, D, and E are 460.75 kN/mm, 489.69 kN/mm and 502.43 kN/mm.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. An apparatus for improved pedestrian safety, comprising:
    a vehicle front end including a hood, and a latch-supporting top horizontal beam located immediately under the hood when the hood is closed; and
    an energy absorber having at least one hollow crush lobe secured on top of the top horizontal beam with the at least one crush lobe extending away from the top horizontal beam in a position where, upon a pedestrian impact directed downward toward the top of the top horizontal beam, sidewalls of the at least one crush lobe crumple and collapse along with a front of the hood to absorb energy.

2. The apparatus of claim 1, wherein the energy absorber includes a base flange, and the at least one crush lobe includes a plurality of the side walls extending from the base flange, and a transverse top wall interconnecting the side walls and spaced from the base flange.

3. The apparatus of claim 2, wherein the at least one crush lobe includes at least two adjacent crush lobes spaced apart and connected by the base flange.

4. The apparatus of claim 3, wherein the at least one crush lobe includes a latch-adjacent crush lobe for energy absorption when the pedestrian impact is located near a hood latch.

5. The apparatus of claim 1, wherein the energy absorber includes polymeric material.

6. The apparatus of claim 5, wherein the energy absorber is a unitary molding of a single continuous polymeric material.

7. The apparatus of claim 1, wherein the energy absorber abuts the top of the top horizontal beam of the bulkhead.

8. The apparatus of claim 7, wherein the at least one crush lobe abuts and extends upward from a top surface of the top horizontal beam.

9. The apparatus of claim 7, wherein the at least one crush lobe abuts a front surface of the top horizontal beam.

10. The apparatus of claim 7, wherein the at least one crush lobe of the energy absorber abuts a top surface and a front surface of the horizontal top beam.

11. In a vehicle including a hood, and a hood-latch-supporting top horizontal beam, an improvement comprising:
    an energy absorber having at least one hollow crush lobe attached to a top of the top horizontal beam with the at least one crush lobe extending away from the top horizontal beam in a position where, upon a pedestrian impact directed downward toward the top of the top horizontal beam, sidewalls of the at least one crush lobe crumple and collapse along with the hood toward the top horizontal beam to absorb energy.

12. The improvement of claim 11, wherein the energy absorber includes a base flange abutting the top horizontal beam, and the at least one crush lobe includes a plurality of the side walls extending from the base flange.

13. The improvement of claim 12, wherein the at least one crush lobe includes at least two adjacent crush lobes spaced apart by the base flange.

14. The improvement of claim 11, wherein the at least one crush lobe includes a latch-adjacent crush lobe for energy absorption when the pedestrian impact is located near a vehicle hood latch.

15. The improvement of claim 11, wherein the energy absorber is a unitary molding of a single continuous polymeric material.

16. The improvement of claim 11, wherein the energy absorber is attached to and abuts a top surface of the top, horizontal beam.

17. The improvement of claim 11, wherein the at least one crush lobe abuts a front surface of the top horizontal beam.

18. A method of improving pedestrian safety when impacted by a vehicle including a hood and structural components near a front of the hood, the method comprising steps of:
    providing a hood-latch-supporting top horizontal beam of the structural components;
    providing an energy absorber having at least one hollow crush lobe; and
    positioning the energy absorber in front of and on top of the top horizontal beam with the at least one crush lobe extending away from the top horizontal beam in a position where, upon a pedestrian impact directed downward toward the the top of the top horizontal beam, sidewalls of the at least one crush lobe crumple and collapse along with the hood toward the top horizontal beam to absorb energy.

* * * * *